(12) United States Patent
Jones et al.

(10) Patent No.: US 6,940,993 B2
(45) Date of Patent: Sep. 6, 2005

(54) SYSTEM AND METHOD FOR EMBEDDING A WATERMARK SIGNAL THAT CONTAINS MESSAGE DATA IN A DIGITAL IMAGE

(75) Inventors: Paul W. Jones, Churchville, NY (US); Chris W. Honsinger, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 643 days.

(21) Appl. No.: 09/736,067

(22) Filed: Dec. 13, 2000

(65) Prior Publication Data

US 2002/0106103 A1 Aug. 8, 2002

(51) Int. Cl.[7] ................................................. G06K 9/00
(52) U.S. Cl. ....................... 382/100; 382/280; 713/176; 358/3.28
(58) Field of Search ................................ 382/100, 280; 713/176–179; 358/3.28

(56) References Cited

U.S. PATENT DOCUMENTS

| | | | | |
|---|---|---|---|---|
| 5,530,759 A | * | 6/1996 | Braudaway et al. | ........... 380/54 |
| 5,641,596 A | | 6/1997 | Gray et al. | |
| 5,699,427 A | | 12/1997 | Chow et al. | |
| 5,859,920 A | * | 1/1999 | Daly et al. | .................. 382/115 |
| 6,031,914 A | | 2/2000 | Tewfik et al. | |
| 6,044,156 A | | 3/2000 | Honsinger et al. | |
| 6,130,741 A | * | 10/2000 | Wen et al. | ..................... 355/40 |
| 6,449,380 B1 | * | 9/2002 | Acharya et al. | ............. 382/100 |
| 6,496,591 B1 | * | 12/2002 | Rhoads | ........................ 382/100 |
| 6,535,617 B1 | * | 3/2003 | Hannigan et al. | ........... 382/100 |
| 6,567,533 B1 | * | 5/2003 | Rhoads | ........................ 382/100 |
| 6,654,501 B1 | * | 11/2003 | Acharya et al. | ............. 382/235 |

OTHER PUBLICATIONS

Barni et al., "A DCT–Domain System For Robust Image Watermarking", Signal Processing 66 (1998), pp. 357–372.
Marvel et al., "A Methodology For Data Hiding Using Images", IEEE, 1998, pp. 1044–1047.
Barni et al., "Robust Watermarking Of Still Iamges For Copyright Protection", IEEE, 1977, pp. DSP 97–499—DSP 97–502.
Meng et al., "Embedding Visible Video Watermarks In The Compressed Domain", IEEE, 1998, pp. 474–477
Kundur et al., *A Robust Digital Image Watermarking Method using Wavelet–Based Fusion*, Proc. IEEE Int. Conf. Image Processing, vol. I, 1997, pp. 544–547.
Hartung et al., *Multimedia Watermarking Techniques, Proceedings of the IEEE*, vol. 87, No. 7, Jul. 1999, pp. 1079–1107.
Wolfgang et al., *Perceptual Watermarks for Digital Images and Video, Proceedings of the IEEE*, vol. 87, No. 7, Jul. 1999, pp. 1108–1126.

* cited by examiner

*Primary Examiner*—Jon Chang
*Assistant Examiner*—Charles Kim
(74) *Attorney, Agent, or Firm*—Peyton C. Watkins (57) ABSTRACT

A method for embedding a watermark signal that contains message data in a digital image represented as a two-dimensional array of pixel values, includes the steps of: providing a dispersed message image having pixel values representative of the message data; modifying each pixel value of the dispersed message image as a function of the corresponding pixel value in the digital image; and combining the modified dispersed message image with the digital image to produce a watermarked image.

10 Claims, 5 Drawing Sheets

SYSTEM AND METHOD FOR EMBEDDING A WATERMARK SIGNAL THAT CONTAINS MESSAGE DATA IN A DIGITAL IMAGE

FIELD OF THE INVENTION

The invention relates generally to the field of digital image processing, and in particular to a method for embedding watermarks in digital images.

BACKGROUND OF THE INVENTION

Digital watermarking refers to the embedding of a message in an image or image sequence for such purposes as establishing ownership, tracking the origin of the data, preventing unauthorized copying, or conveying additional information (meta-data) about the content. Watermarking has potential uses in a wide range of products, including digital still and video cameras, printers and other hardcopy output devices, and content delivery services (e.g., Internet-based photofinishing).

Numerous image watermarking methods have been described in the prior art, including both patents and the technical literature. Many of these methods are described in review papers such as: Hartung and Kutter, *Multimedia Watermarking Techniques*, Proc. IEEE, 87(7), pp. 1079–1107 (1999), and Wolfgang et al., *Perceptual Watermarks for Digital Images and Video*," Proc. IEEE, 87(7), pp. 1108–1126 (1999).

A basic distinction between various methods is whether the watermark is applied in the spatial domain or the frequency domain. In either approach, many techniques use a pseudo-random (PN) sequence in the watermark generation and extraction processes. The PN sequence serves as a carrier signal, which is modulated by the original message data, resulting in dispersed message data (i.e., the watermark) that is distributed across a number of pixels in the image. A secret key (i.e., seed value) is commonly used in generating the PN sequence, and knowledge of the key is required to extract the watermark and the associated original message data.

The use of a PN sequence in the watermarking process typically results in a watermark signal that has similar visual characteristics to a random noise field. While noise is an inherent component of digital images because of sensor noise (whether originating from film grain when film is scanned or from sensor noise in a digital camera), it is generally desirable to minimize the additional noise that is introduced by the watermarking process. This is accomplished by reducing the amplitude of the watermark signal so that it is below the threshold of perception (i.e. subthreshold). The result is a watermark that is visually transparent, i.e. the watermark cannot be perceived by an observer under typical viewing conditions.

In some applications it may be impossible to provide sufficient robustness to the embedded watermark and still meet the goal of visual transparency. This is because a low amplitude watermark is more vulnerable to removal attacks, where an attempt is made to remove the watermark by using various types of image processing methods, e.g. lowpass filtering. In such cases, it becomes necessary to increase the watermark amplitude, which may result in a watermark pattern that is easily detectable (i.e. suprathreshold), and perhaps even objectionable, when viewed by an observer.

There are watermarking techniques that intentionally use suprathreshold watermarks. Some of these techniques embed watermarks that are easily visible to any observer, e.g., a logo that is placed in the corner of a television screen to indicate the broadcasting station. These types of watermarks are called obvious watermarks. Other suprathreshold watermark techniques are more subtle in that the watermark may be obvious to an observer who knows the nature of the watermark, but it is not obvious to an uninformed observer. An example of this latter approach can be found in U.S. Pat. No. 5,699,427 issued Dec. 16, 1997 to Chow et al. entitled *Method to Deter Document and Intellectual Property Piracy Through Individualization*. This patent teaches a method for modifying documents and images in such a way that numerous variations of the original can be produced, but these variations do not change the overall meaning or usefulness of the documents or images. The variations can include changing the spelling of words in a document or the color of objects in an image. A limitation of this approach is that the amount of embedded information is constrained, and it is also very difficult to embed arbitrary information such as a time/date stamp. Moreover, the method requires significant manual intervention to identify the words, objects, etc. that can be modified without affecting the overall meaning or usefulness of the document or image.

There is a need therefore to have a watermarking technique for images that allows the embedding of a high amplitude watermark in such a way that: 1) the resulting watermark is not objectionable to an observer; 2) arbitrary information can be included in the watermark; and 3) manual intervention is not required to perform the embedding process.

SUMMARY OF THE INVENTION

The need is met according to the present invention by providing a method for embedding a watermark signal that contains message data in a digital image represented as a two-dimensional array of pixel values that includes the steps of: providing a dispersed message image having pixel values representative of the message data; modifying each pixel value of the dispersed message image as a function of the corresponding pixel value in the digital image; and combining the modified dispersed message image with the digital image to produce a watermarked image.

Advantages

The present invention has the advantage of making the visual characteristics of the watermark look like an expected attribute of an image that is produced by a given imaging system. In particular, the present invention minimizes the objectionability of the watermark pattern by making its appearance similar to the expected noise for the given imaging system.

DETAILED DESCRIPTION OF THE INVENTION

The present invention is preferably implemented by a programmed digital computer. The computer can be a general purpose digital computer or a special purpose computer for digital image processing. It is within the ordinary skill in the programming art to provide a computer program for practicing the present invention from the following description of the invention.

Figure 1:
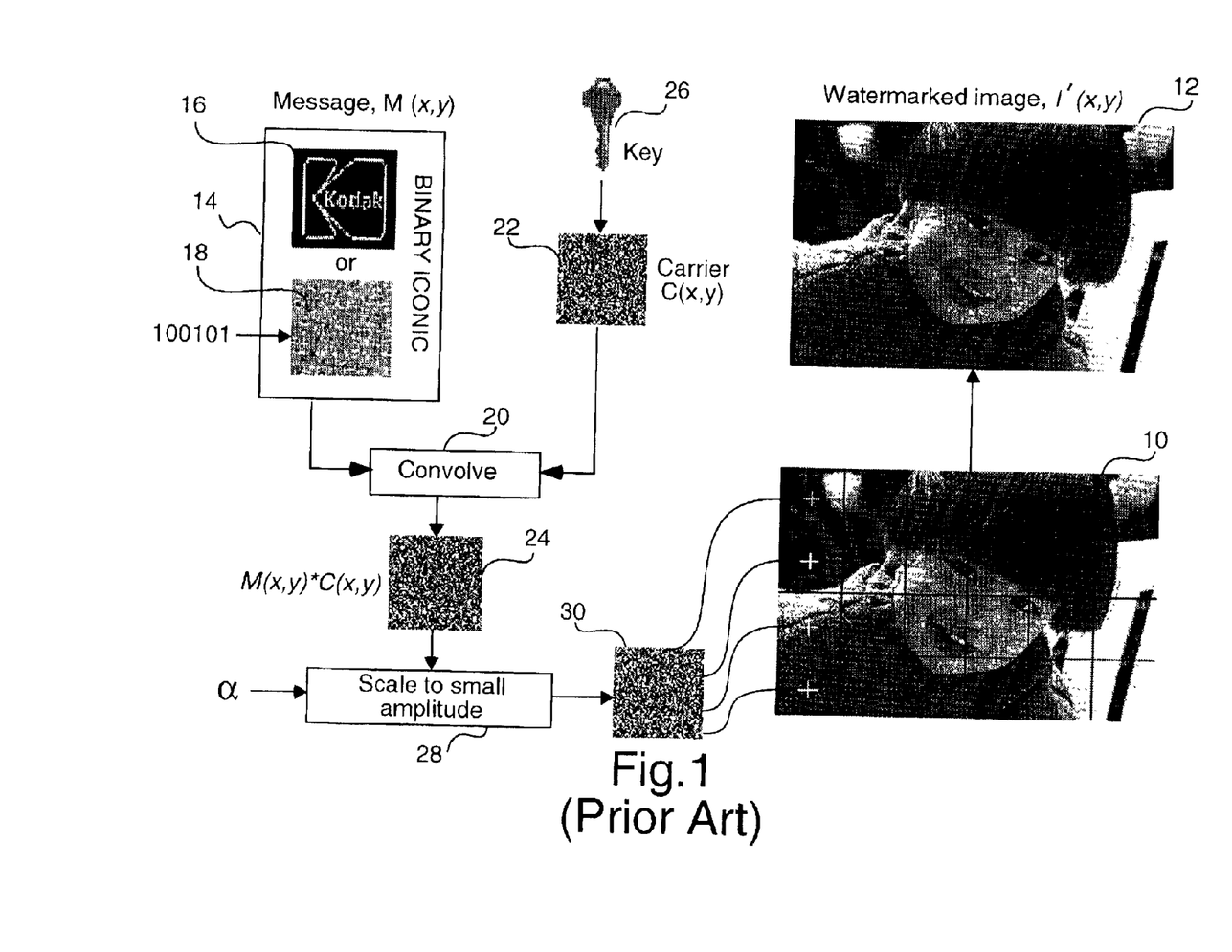
FIG. 1 is a prior art method for embedding a watermark in an original image.

A preferred data embedding technique for use with the present invention is disclosed in U.S. Pat. No. 6,044,156 issued Mar. 28, 2000 to Honsinger et al. entitled *Method for Generating an Improved Carrier for Use in an Image Data Embedding Application*. This patent is included in its entirety by reference. Referring to FIG. 1, in this technique, an original two-dimensional digital image 10, I(x,y), is processed to produce a watermarked image 12, I'(x,y). A two-dimensional message 14, M(x,y), represents the data to be embedded in the original image 10. In its most general form, the message 14 is an image, and it can represent an icon 16 (e.g., a trademark), or it can represent the bits 18 in a binary message. In the latter case, the on and off states of the bits are represented as plus and minus ones (more specifically, positive and negative delta functions), which are placed in predefined and unique locations across the message image. Examples of iconic message data are trademarks, corporate logos or other arbitrary images. In order to minimize the message energy, an edge map of the icon is often used instead of the actual icon. Examples of binary message data are 32-bit representations of URL's, and copyright ID codes, or authentication information.

As shown in FIG. 1, the fundamental steps for embedding message data in an original image with this method are:
1. A n×n message image 14, M(x,y), is generated from the message data;
2. The message image 14 is circularly convolved 20 with a n×n carrier image 22, C(x,y) to produce a n×n dispersed message image 24. The carrier image may be produced using a secure key 26 as is known in the prior art;
3. The dispersed message image 24 is scaled 28 in amplitude using a multiplicative factor α; and
4. The scaled dispersed message image 30 is added to the original image 10 as contiguous n×n tiles to form a watermarked image 12, I'(x,y).

The carrier image 22 is derived from a PN sequence, and its properties can be modified to achieve certain performance goals, such as robustness to removal attacks. The scaling factor α is an arbitrary constant that is generally chosen to make the embedded energy simultaneously invisible and robust to common processing. Typically, the size of the dispersed message image 24 is chosen to be smaller than the size of original image 10, and the tiling process allows the scaled dispersed message image 30 to be repetitively embedded over the extent of the original image 10. The repetitive structure provides robustness to the watermark when image processing operations (such as cropping, compression, lowpass filtering, etc.) are applied to the watermarked image. Other watermarking techniques use different methods for embedding the message data, but the repetitive nature of the embedding process is a common aspect because of this improved robustness.

This embedding process for each tile can be described mathematically as:

$$I'_i(x,y) = \alpha[M(x,y) * C(x,y)] + I_i(x,y), \quad (1)$$

where the symbol * represents circular convolution and the subscript i indicates the $i^{th}$ tile (i=1, . . . , N). From Fourier theory, spatial convolution is equivalent in the frequency domain to adding phase while multiplying magnitudes. Therefore, the effect of convolving the message image 14 with the carrier image 22 is to distribute the message energy in accordance with the phase of the carrier image and to modulate the amplitude spectrum of the message image with the amplitude spectrum of the carrier image. If the message image were a single delta function, δ(x,y), and the carrier image had random phase and uniform Fourier magnitude, the effect of convolving with the carrier image would be to distribute the delta function over space. Similarly, the effect of convolving a message image with a random phase carrier image is to spatially disperse the message energy.

Figure 2:
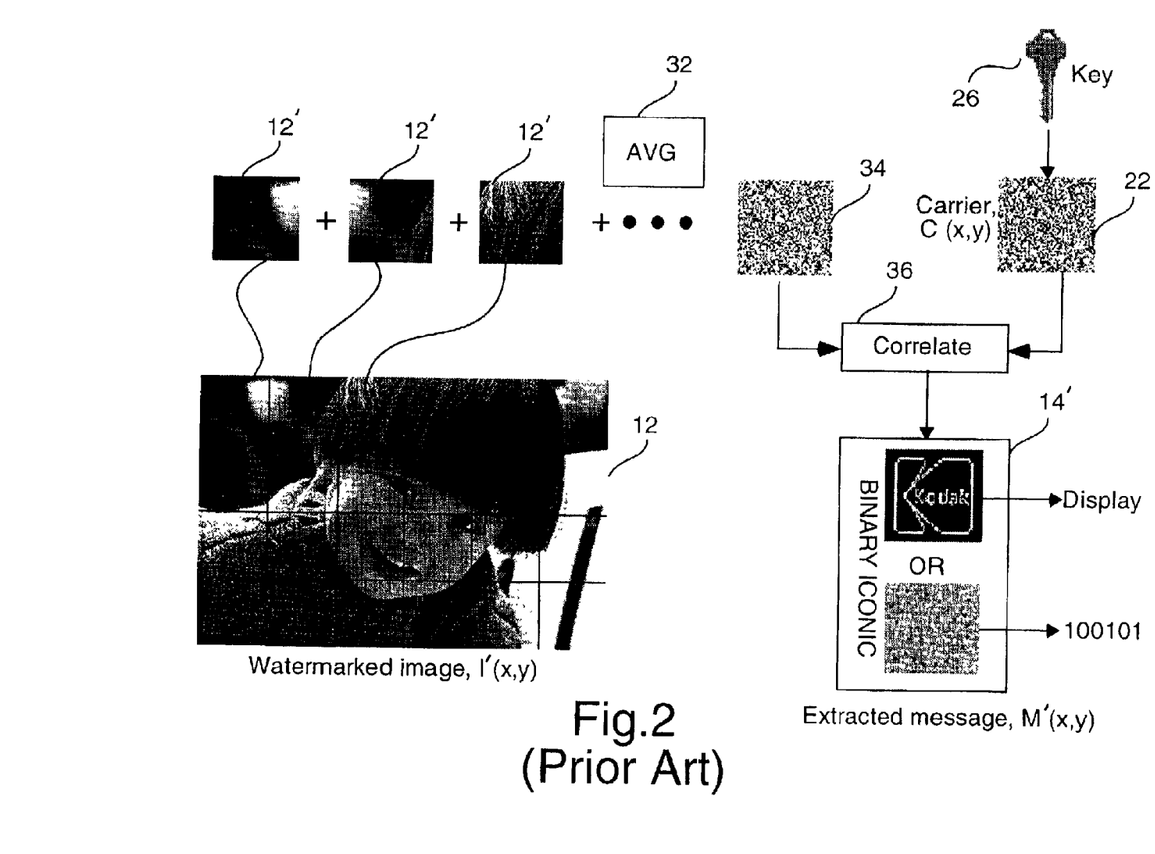
FIG. 2 is a prior art method for extracting a watermark from an image containing an embedded watermark.

As shown in FIG. 2, the process as described by Honsinger et al. for extracting the message data from a watermarked image 12 consists of the following fundamental steps:
1. Contiguous n×n tiles 12' are formed from the watermarked image 12, I'(x,y);
2. The tiles 12' are averaged 32 across each spatial location (x,y) to form an averaged tile 34;
3. The averaged tile 34 is circularly correlated 36 with the n×n carrier image 22 C(x,y) to produce an extracted n×n message image 14', M'(x,y); and
4. The message data is recovered from the extracted message image 14'.

The averaging 32 of the individual tiles 12' improves the extraction of the message image because the dispersed message image in each tile will add constructively (since it is the same in each tile), while the corresponding original image content in each tile will add destructively (since it is typically different in each tile).

This watermark extraction process can be described mathematically as:

$$M'(x, y) = \left[\frac{1}{N}\sum_{i=1}^{N} I'_i(x, y)\right] \otimes C(x, y) \quad (2)$$

$$= \left[\frac{1}{N}\sum_{i=1}^{N} (\alpha[M(x, y) * C(x, y)] + I_i(x, y))\right] \otimes C(x, y)$$

$$= \alpha[M(x, y) * C(x, y)] \otimes C(x, y) + \left[\frac{1}{N}\sum_{i=1}^{N} I_i(x, y)\right] \otimes C(x, y)$$

where the symbol $\hat{x}$ represents circular correlation. Correlation is similar to convolution in that Fourier magnitudes also multiply. In correlation, however, phase subtracts. Therefore, the phase of the carrier image subtracts when the watermarked image is correlated with the carrier image, thus leaving the message image. Indeed, if we assume that the carrier image is designed to have uniform Fourier amplitude, then the process of correlation of the carrier image on the watermarked image in Eq. 2, can be reduced to:

$$M'(x, y) = \alpha M(x, y) + noise. \quad (3)$$

That is, the extracted message image is a scaled version of the original message image plus noise due to the cross correlation of the summed original image tiles with the carrier image.

Figure 3:
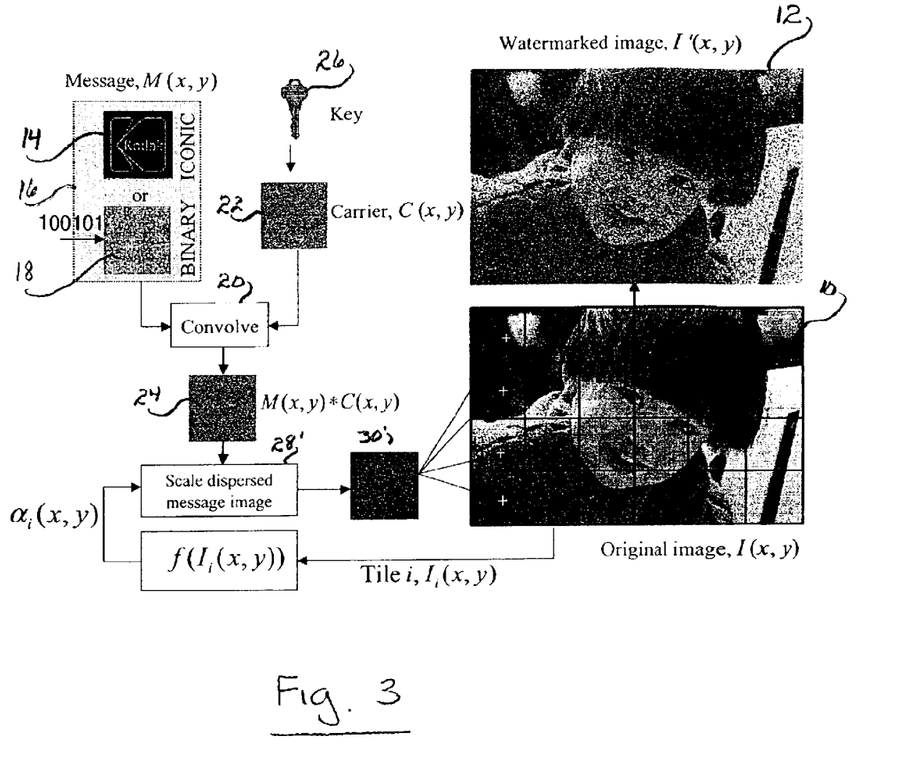
FIG. 3 is a block diagram that illustrates the embedding of a signal-dependent watermark according to the present invention.

In the method of Honsinger et al., the amplitude of the watermark is adjusted by changing the scaling factor α. However, the amplitude is always adjusted by the same amount throughout the entire image. Referring to FIG. 3, in the present invention, the amplitude of the dispersed message image 24 is scaled 28' at each spatial location (x, y) in each tile i to produce a scaled dispersed message image 30'. With this modification, the embedding equation becomes:

$$I'_i(x, y) = \alpha_i(x, y)[M(x, y)*C(x, y)] + I_i(x, y), \quad (4)$$

where $\alpha_i(x, y)$ is a signal-dependent scaling factor that varies from pixel to pixel within a given tile and from tile to tile. Specifically, $$\alpha_i(x, y) = f(I_i(x, y)), \quad (5)$$

where $f(I_i(x, y))$ indicates that the dispersed message image amplitude scaling factor is a function of the original image pixel value $I_i$ at each spatial location (x,y).

As an illustration of signal-dependent noise and the resulting effect on the watermark amplitude scaling factor, we consider a system that uses a conventional color negative photographic film as the original capture medium. After exposure and development, the film is digitized by scanning with a digital scanner. Both film grain and scanner noise are introduced during this process, and we can determine the overall system noise as a function of the signal level (e.g., the signal level could be the codevalue that corresponds to a particular density in the original negative). The characterization of the system noise is typically performed by measuring the standard deviation, σ, of an image region containing a uniform signal level, and repeating this measurement at different signal levels. A complete description of methods for characterizing noise in film-based systems can be found in U.S. Pat. No. 5,641,596 issued Jun. 24, 1997 to Gray et al. entitled *Adjusting Film Grain Properties in Digital Images*.

Figure 4:
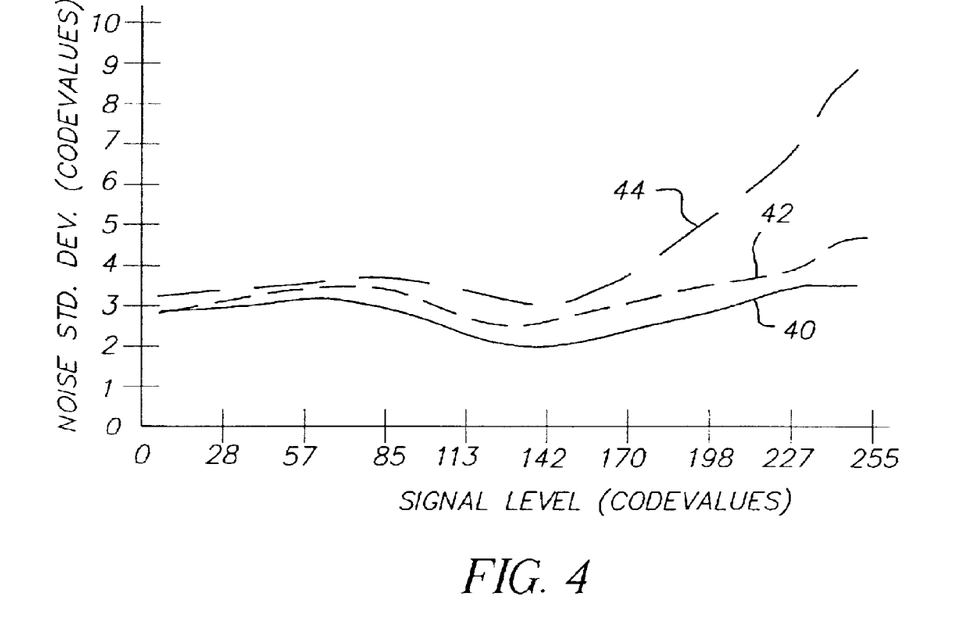
FIG. 4 is an example of noise standard deviation as a function of signal level for signal-dependent noise.

An example of the noise standard deviation as a function of signal level is shown in FIG. 4, where all values have been specified in terms of 8-bit codevalues. In this figure, three different single-dependent relationships are shown: one for the red color channel 40, one for the green channel 42, and one for the blue channel 44. Regardless of the color channel, it can be seen the noise standard deviation first increases slightly, then decreases, and finally increases again as the signal level is increased. This behavior is the result of the combination of the film grain noise increasing and then decreasing as the signal level increases, while the scanner noise starts low and then increases with increasing signal level.

To apply the signal-dependent characterization of the system noise as shown in FIG. 4, the scaling factor is made proportional to the noise standard deviation that corresponds to the signal level at each location, i.e.

$$\alpha_i(x, y) = k\sigma(I_i(x, y)), \quad (6)$$

where k is a constant. We can choose k so that the amplitude of the resulting watermark signal matches the overall system noise, or it may advantageous to increase or decrease k to provide more or less noise, respectively, in the watermarked image. The mapping of the image values $I_i(x, y)$ to a noise standard deviation σ can be performed using a lookup table or a mathematical equation. Such mappings are described in the aforementioned patent by Gray et al. To better mimic the overall system noise characteristics, it is also desirable to use separate mappings for the red, green, and blue color channels as shown in FIG. 4. For this example, the result is that the watermarked image will have more noise in the blue channel than the red and green channels. This is a common characteristic of film/scanner systems.

There are watermarking techniques in the prior art that also adjust the watermark amplitude based upon local signal content in the original image. Descriptions of such techniques can be found, for example, in the aforementioned review paper by Wolfgang et al.; in a paper by Kundar et al. entitled *A Robust Digital Image Watermarking Method Using Wavelet-Based Fusion*, Proc. IEEE Int. Conf. Image Processing (ICIP), Vol. I, pp. 544–547, 1997; and in U.S. Pat. No. 6,031,914 issued Feb. 29, 2000 to Tewfik et al. entitled *Method and Apparatus for Embedding Data, Including Watermarks, in Human Perceptible Images*. There are two important distinctions between these prior art methods and the present invention. First, the motivation for locally changing the watermark amplitude in the prior art methods is to take advantage of perceptual masking. Masking allows for an increase in the watermark amplitude in image regions where there is significant image content, e.g. edge regions or texture regions, for the purpose of increasing the watermark robustness. The image content masks the increased amplitude so that the watermark is still below the threshold of perception. In comparison, the present invention does not use masking to maintain imperceptibility of the watermark. Instead, it uses the signal-dependent nature of imaging systems to adjust the watermark amplitude so as to provide a visible watermark signal that is more natural in appearance. Of course, increasing the watermark amplitude in certain areas because of signal-dependent noise may also take advantage of masking to some extent, thus lowering the visibility of the signal-dependent watermark. However, the present invention is not motivated by the desire to keep the watermark below the threshold of perception. To the contrary, the present invention specifically allows watermark patterns to be perceptible, but reduces the objectionability of the visible patterns by making the watermark have visual characteristics that are consistent with the characteristics of the imaging system. As a side benefit, the signal-dependent nature of the watermark may also improve the watermark robustness by allowing overall larger amplitudes, depending on the distribution of image values (which correspondingly determine the signal-dependent scaling factor).

The second distinction between the prior art and the present invention is that the adjustment of the watermark amplitude is based upon different image attributes. In the prior art masking techniques, the amplitude adjustment is performed over a local region (e.g., an 8×8 block of pixels), and the variance of the signal over the block is used to control watermark amplitude. In comparison, the amplitude adjustment in the present invention is performed separately for each individual pixel in the image, and the pixel value (not a local variance) is used to control the scaling factor.

The adjustment of the watermark amplitude at each pixel location affects the estimated message image that is obtained during the extraction process. We can rewrite Eq. 2 to include the signal-dependent scaling factor $\alpha_i(x, y)$:

$$M'(x, y) = \left[\frac{1}{N}\sum_{i=1}^{N} I'_i(x, y)\right] \otimes C(x, y) \quad (7)$$

$$= \left[\frac{1}{N}\sum_{i=1}^{N} (\alpha_i(x, y)[M(x, y)*C(x, y)] + I_i(x, y))\right] \otimes C(x, y)$$

$$= \left[\frac{1}{N}\sum_{i=1}^{N}\alpha_i(x, y)\right][M(x, y) * C(x, y)] \otimes C(x, y) +$$

$$\left[\frac{1}{N}\sum_{i=1}^{N}I_i(x, y)\right] \otimes C(x, y)$$

As before, if we assume that the carrier is designed to have uniform Fourier amplitude, then the process of correlation of the carrier on the embedded image in Eq. 7, can be reduced to:

$$M'(x, y) = \left[\frac{1}{N}\sum_{i=1}^{N}\alpha_i(x, y)\right]M(x, y) + \text{noise} \quad (8)$$

$$= \overline{\alpha}_i(x, y)M(x, y) + \text{noise}$$

where $\overline{\alpha}(x, y)$ is the average scaling factor across all tiles at each spatial location (x, y). If a sufficiently large number of tiles are averaged, it is expected that $\overline{\alpha}(x, y)$ would be approximately the same for every spatial location (x, y), i.e., $$M'(x, y) \approx \overline{\alpha}M(x, y) + \text{noise}. \quad (9)$$

This is the same relationship that was obtained for the case of a constant scaling factor, and thus the signal-dependent watermark process does not significantly affect the extraction process if a large number of tiles are available.

Even if only a few tiles are available, the resulting $\overline{\alpha}(x, y)$ will have mainly low frequency variations. In the method by Honsinger et al., the determination of the message data from the estimated message image M'(x, y) is done on a local basis, and the low frequency variations in M'(x, y) due to variations in $\overline{\alpha}(x, y)$ will not greatly affect the extraction process. However, in some cases, it may be advantageous to undo the variations in M'(x, y) that have been introduced by $\alpha(x, y)$. This can never be done perfectly since we only have access to the watermarked image I'(x, y), not the original image I(x, y), during the extraction process. Still, I'(x, y) provides an estimate of I(x, y), and we can use the signal dependent function f(I'(x, y)) to estimate $\alpha_i(x, y)$ for each pixel in each tile. Since the watermark signal is similar to a noise field, it is also possible to filter I'(x, y) to provide a better estimate of I(x, y). Any number of well-known noise filtering methods can be used for this purpose, e.g., lowpass linear smoothing filters or nonlinear filters such as median filters. Regardless of the method that is used to estimate I(x, y), the resulting estimate can be evaluated with the signal dependent function to produce an estimate of the watermark scaling factor at each spatial location in each tile, i.e., $$\alpha'_i(x, y) = f((I'_i(x, y)). \quad (10)$$

This estimate can then be used to normalize each pixel of each tile of the watermarked image prior to the averaging of the tiles:

$$M'(x, y) = \left[\frac{1}{N}\sum_{i=1}^{N}\frac{a_i(x, y)}{a'_i(x, y)}\right]M(x, y) + \text{noise} \quad (11)$$

$$\approx M(x, y) + \text{noise}$$

Figure 5:
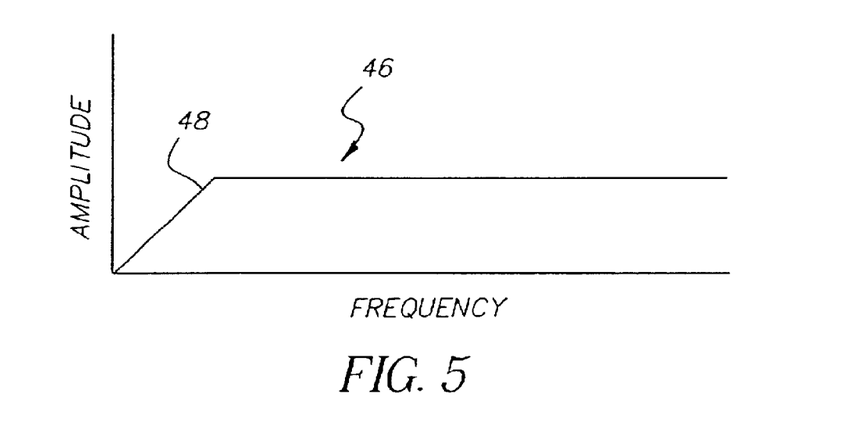
FIG. 5 is a prior art preferred embodiment for the frequency spectrum of a watermark carrier signal.

In addition to applying signal dependencies to the carrier amplitude, it may also be desirable to shape the carrier frequency spectrum (specifically, the Fourier amplitude spectrum) to make the embedded signal appear more like film grain. In U.S. Pat. No. 6,044,156, referenced above, the preferred carrier possesses a flat frequency spectrum except near the DC frequency. Referring to FIG. 5, a flat frequency amplitude spectrum 46 is preferred to ensure that the message image is reconstructed with the highest fidelity. However, as described in the Honsinger patent, the carrier spectrum is shaped to include a ramp 48 in Fourier amplitude from DC frequency in order to minimize the impact of the cross-correlation of the carrier with the image data.

Figure 6:
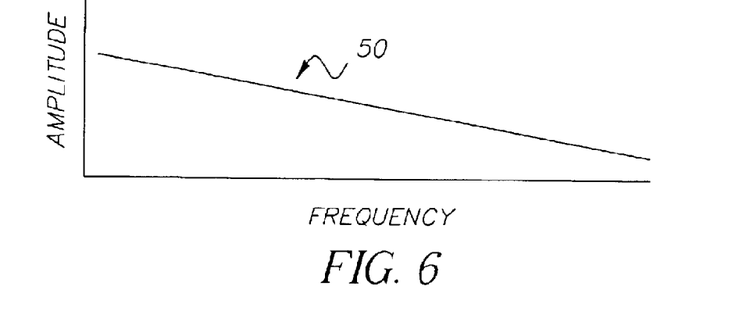
FIG. 6 is an example of the frequency spectrum of film grain noise.
Figure 7:
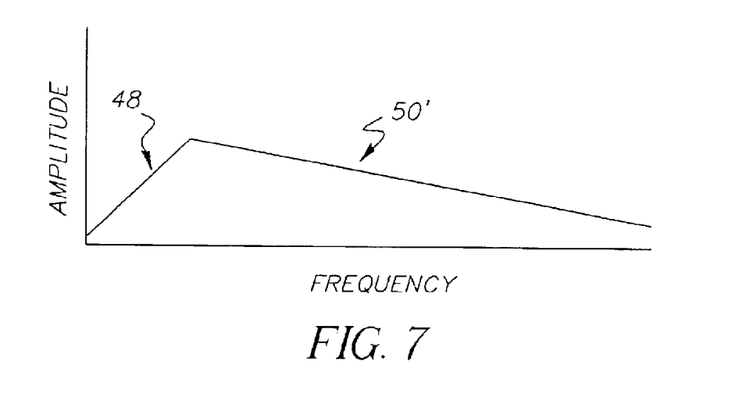
FIG. 7 is an example of a carrier frequency spectrum that is modified to simulate the frequency spectrum of film grain noise.
Figure 8:
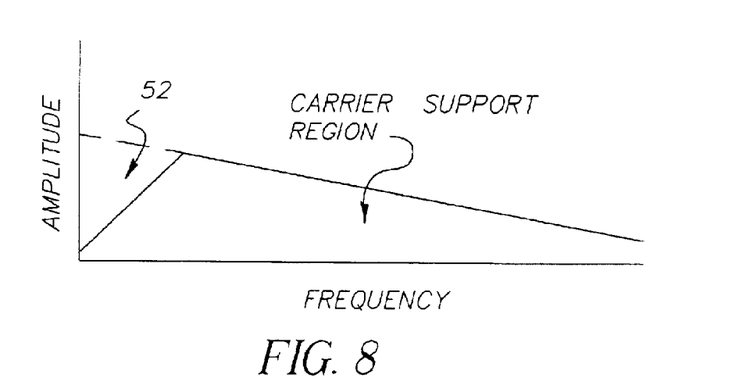
FIG. 8 is an example of the frequency spectrum components that represent the carrier support region and the film grain noise support region.

In contrast to the flat spectrum recommended by Honsinger et al., the shape of the Fourier amplitude spectrum of film grain noise (as well as many other imaging system noise sources) generally is a decreasing function with frequency. FIG. 6 depicts an example of a typical Fourier amplitude spectrum 50 for film grain. U.S. Pat. No. 5,641,596, referenced above, describes methods for characterizing the spatial correlation coefficients of film grain, which is entirely equivalent to characterizing the Fourier amplitude spectrum. As shown in FIG. 7, according to one aspect of the present invention, the carrier spectrum maintains the ramp 48 in Fourier amplitude, but the remaining carrier spectrum 50' is shaped to the same form as that of film grain. Because the carrier amplitude spectrum decreases with frequency in the region that was preferably flat according to Honsinger, the impact of this shaping is to reduce the information carrying capacity of the embedding algorithm. However, given that the film grain noise can be a preferred visual attribute, increasing the amplitude (or, equivalently, increasing the visibility) of the watermark pattern can compensate for the loss of information carrying capacity. A drawback of this embodiment is the inclusion of the ramp region in the carrier spectrum does not completely simulate the appearance of film grain noise. A solution to this problem is to add an additional noise component (independent of the watermarking process) to the dispersed message image spectrum to fill in the low frequency ramp region 52 as shown in FIG. 8. This additional noise component is not an integral part of the watermarking process, but is included only to provide better visual qualities to the watermark pattern.

In a preferred embodiment of the invention, the carrier image spectrum is shaped identically to the film grain noise. FIG. 6 depicts the amplitude spectrum of this carrier. This eliminates the need to fill in the ramp region with non-information carrying noise data. However, for the reasons discussed above, this process may affect extraction performance, because correlation of the embedded image with such a carrier will produce a strong cross-correlation of the carrier with the original image content. This problem may be eliminated by defining two carrier images, an embedding carrier image and an extracting carrier image. The embedding carrier image is designed using the full frequency spectrum shape of film grain 50 as in FIG. 6, but the extracting carrier image is filtered to include the ramp 48 at low frequencies as in FIG. 7. As a result, the embedding carrier image contains the extraction carrier image in addition to the extra low frequency energy that is needed to model the film grain noise. Practically, this causes no performance problems and allows a simpler embedding implementation.

For completeness, we note that the phase spectrum of film grain noise is of random character. Visually, observers do not perceive or care about the local pixel arrangements due to the phase of the noise. They are far more sensitive to the effects produced by the amplitude spectrum of the noise. Therefore, the phase generation process of the carrier requires no change from that described in U.S. Pat. No. 6,044,156.

As mentioned previously, the present invention offers a method for minimizing the objectionability of a high amplitude watermark. However, in some systems, suprathreshold watermarking may actually improve perceived quality. An example of such a system is digital cinema. Digital cinema refers to the electronic distribution and display of theatrical movies. Studios and distributors have a strong need to protect the movie content from unauthorized use, and watermarking can assist by establishing ownership and tracing the source of stolen content (through the use of hidden date/time/location stamps inserted at the time of the movie presentation). To facilitate the distribution of the movie content, it is typically compressed by a significant amount using a technique such as MPEG. The process of compression often removes a large portion of the high frequency content, resulting in a displayed movie without the expected look that includes film grain noise. The present invention can be used to add signal-dependent noise to the compressed movie prior to display, thus providing a more natural look, while also providing the benefit of a watermark signal.

In the preceding discussion, the present invention was used to replace film grain noise that had been removed by a compression process, while simultaneously providing a watermark signal. The same concept can be extended to provide benefits in other systems. For example, it may be advantageous to deliberately remove the inherent noise from an image or image sequence (using one of any well-known noise reduction techniques), and then replace the removed noise with a watermark signal that has a desired visual appearance. The watermark signal may have a visual appearance that is similar to the noise that was removed, or it could have completely different appearance (for example, a higher or lower noise level, or noise characteristics that mimic a different type of film). Techniques for creating noise fields with the desired characteristics are described in the aforementioned patent by Gray et al. The removal of existing noise and subsequent replacement by a watermark signal also provides for a system where an existing watermark pattern (which typically has the appearance of a noise field) can be effectively removed and then a new watermark pattern (perhaps containing different information than the original watermark or a combination of information from the original watermark and new information) is inserted. In a conventional system, a new watermark would be added directly to the image containing the original watermark, thus elevating the overall noise level due the addition of two watermark patterns. By effectively removing the first watermark pattern prior to the insertion of the new watermark pattern, the overall noise of the twice-watermarked image is kept to a desired level.

While the invention has been discussed in terms of the watermarking process as described by Honsinger et al., it is obvious how the same method can be applied to any spatial domain watermarking process that uses a random noise carrier in the watermarking process. Some spatial domain watermarking processes use more than one carrier within a single image, where the resulting watermark pattern is the sum of the carriers after modulation by the message information. Signal-dependent scaling of the watermark pattern can also be performed for these types of watermarking methods. The invention can also be used for some types of frequency domain watermarking methods that use a PN sequence to produce a watermark pattern that has the visual characteristics of random noise. However, most frequency domain methods use frequency decompositions over local regions (e.g., 8×8 blocks), and it is not possible to adjust the watermark amplitude at each pixel location. Still, signal-dependent adjustment of the watermark can be performed using the average signal value within the local region, and this process is fundamentally different that the prior art methods that consider masking in adjusting the watermark amplitude.

The invention has been described in detail with particular reference to certain preferred embodiments thereof, but it will be understood that variations and modifications can be effected within the spirit and scope of the invention.

| PARTS LIST | |
|---|---|
| 10 | two dimensional original image |
| 12 | watermarked image |
| 12' | contiguous tiles from watermarked image |
| 14 | two dimensional message image |
| 14' | extracted message image |
| 16 | message icon |
| 18 | message bits |
| 20 | circular convolution step |
| 22 | carrier image |
| 24 | dispersed message image |
| 26 | secure key |
| 28 | scale dispersed message image step |
| 28' | scale dispersed message image step |
| 30 | scaled dispersed message image |
| 30' | scaled dispersed message image |
| 32 | averaging of individual tiles step |
| 34 | averaged tile |
| 36 | circular correlation step |
| 40 | red channel noise standard deviation |
| 42 | green channel noise standard deviation |
| 44 | blue channel noise standard deviation |
| 46 | flat frequency amplitude spectrum |
| 48 | ramp in frequency amplitude spectrum |
| 50 | film grain Fourier amplitude spectrum |
| 50' | remaining carrier spectrum |
| 52 | low frequency ramp region |

What is claimed is:

1. A method for embedding a visually perceptible watermark representing message data in an image having a plurality of pixels to produce a watermarked image, wherein the visually perceptible watermark is perceptible to a human observer when the watermarked image is displayed, but the visually perceptible watermark is not objectionable because the visually perceptible watermark emulates an appearance of noise of an imaging system, comprising the steps of:
   a) providing a Fourier amplitude spectrum that is representative of the imaging system noise;
   b) producing a watermark carrier with an Fourier amplitude spectrum that matches the Fourier amplitude spectrum of the imaging system noise;
   c) producing the visually perceptible watermark using the watermark carrier and the message data; and
   d) combining the visually perceptible watermark with the image to produce a watermarked image.

2. The method of claim 1, wherein the watermark amplitude for each pixel is proportional to a noise standard deviation that corresponds to a signal level at the pixel location.

3. The method of claim 1, further comprising the step of removing existing imaging system noise from the image prior to combining the visually perceptible watermark with the image.

4. The method of claim 1, wherein the noise of the imaging system is film grain.

5. The method of claim 1, wherein the watermark carrier has a Fourier amplitude spectrum that matches high frequencies of the Fourier amplitude spectrum of the imaging system noise and contains a ramp from zero for low frequencies.

6. The method of claim 5 further comprising the step of adding low frequency noise to the visually perceptible watermark to match the Fourier amplitude spectrum of the imaging system noise.

7. The method according to claim 6 further comprising the step of extracting the message data from the watermarked image by correlating the watermarked image with the watermark carrier.

8. The method according to claim 5 further comprising the step of extracting the message data from the watermarked image by correlating the watermarked image with the watermark carrier.

9. The method according to claim 1 further comprising the step of extracting the message data from the watermarked image by correlating the watermarked image with the watermark carrier.

10. The method according to claim 1 further comprising the step of extracting the message data from the watermarked image by correlating the watermarked image with a second carrier having a Fourier amplitude spectrum that matches high frequencies of the Fourier amplitude spectrum of the imaging system noise and contains a ramp from zero for low frequencies.

* * * * *